UNITED STATES PATENT OFFICE 2,691,617

CHOLINE GLUCONATE MEDICAMENT

Siegwart Hermann, New York, N. Y.

No Drawing. Application January 13, 1949,
Serial No. 70,817

2 Claims. (Cl. 167—65)

My invention relates to new chemical compounds, and more particularly to new compounds containing nitrogen, as well as methyl-groups.

Chemical compositions of this kind, as, choline, methionine, cysteine, and cystine, are being used more and more, lately, for therapeutical purposes in certain combinations.

Compositions containing choline, methionine, cysteine, cystine, are used principally as a therapeutic agent in the treatment of liver diseases, particularly cirrhosis.

Among known compositions of this kind are: choline chloride, choline dihydrogene citrate, choline borate, choline bicarbonate, and a composition comprising the components methione, choline, inositol and B complex.

All known compositions of this kind are more or less toxic. They cause gastric disturbances, and in addition, they are not stable. If they decompose, trimethylamine will develop, a substance of intolerable taste and smell, which cannot be disguised or concealed by any kind of flavoring. It is, in fact, impossible for patients to take medicaments of this kind repeatedly.

It is an object of this invention to provide new chemical compositions of the group consisting of choline, cysteine, cystine and methionine.

It is another object of this invention to provide compositions of this kind which are stable, of good taste and smell, and which can be used continuously by patients without repugnance.

Furthermore, it is an object of my invention to provide new compositions of this kind which, if used as a medicament, may be applied without causing any damage even to patients suffering from liver diseases.

The manufacture of the new products is also an object of this invention.

Further objects of the invention will be evident from the following specification of my invention.

In carrying out the invention, I use as a component to be combined with compounds of the group comprising choline, cysteine, cystine and methionine, gluconic acid and derivatives of said acid, i. e., lactones of gluconic acid.

I have found through numerous series of experiments relating to the toxicity and pharmacology of many acids that gluconic acid is of much lower toxicity than other compounds contemplated here.

It is a well known fact that persons suffering from liver diseases are unable to detoxify. It is therefore almost immaterial whether intravenous injections or oral administrations are used in such cases, as far as toxicity is concerned.

After this preliminary remark, I wish to state that my experiments have disclosed the following facts:

*Intravenous injections of .25 molar acid in rabbits—Fatal dose: pro 1 kg.*

| | |
|---|---|
| Hydrochloric acid | 75 ccm. |
| Citric acid | 8 ccm. |
| Boric acid | cumulative, very toxic |
| Gluconic acid | 200 ccm. |

In reaction tests of blood and acids, gluconic acid needs the most time to change haemoglobin into hematin. That proves that gluconic acid penetrates very slowly into the blood corpuscles. Gluconic acid is not lipoid soluble.

Gluconic acid is therefore the ideal acid to be combined with choline, methionine, cysteine and cystine.

The new products, according to my invention, are not only non toxic, but also absolutely stable. That means that they do not smell at all. They have a very fine taste. The products are very well tolerated by patients.

A convenient method for the preparation of any of these compounds consists in the combination of molecular proportions of gluconic acid with any one of the other components.

Another method provides the reaction between a lactone of gluconic acid and the base.

Example 1

A method of preparation of choline gluconate.

The theoretical amounts, i. e. 162 parts by weight of gluconic acid are mixed with 100 parts of weight of choline. (Gluconic acid is obtainable as a 50% solution, a syrup.)

The compounds react readily at room temperature. The reaction is finished after a few hours.

To improve the taste of the products a surplus of gluconic acid is preferably used.

Example 2

Another method of preparing choline gluconate consists in mixing 100 gm. of syrup choline bicarbonate CSC with 23-25 gm. of delta gluconic acid lactone (a powder).

The reaction of the components is completed after 12 hours, at room temperature, or, in much shorter time on a water bath at 100° C.

The content of the choline base remains unchanged by the reaction.

The resulting product is palatable odorless syrup, without any after-taste. It may be flavored with a drop of vanilla extract.

The compound obtained as described is a viscous slightly yellow syrup soluble in water, glycerine, diluted ethyl- and methyl-alcohol, acetone; insoluble in ether, chloroform, toluol, benzene, almost insoluble in amylic alcohol, butyl-alcohol; slightly soluble in absolute ethylalcohol.

Choline gluconate is tasteless and odorless. It does not decompose neither on the air nor by boiling. This indestructibility marks it out from other known choline compounds.

The compound has a specific optical rotation as observed in a solution of 5 gm., choline gluconate in 25 cc. water. It shows an angle of polarization of +1, 28 at 26° Celsius. Or $$[\alpha]_D^{26°} = \frac{1.28 \cdot 100}{1 \cdot 20} = 6.4$$

Example 3

Cystine gluconate is prepared by mixing commercial cystine, a powder of low solubility in water with delta gluconic acid lactone, which is a powder too.

Methionine gluconate may be prepared in the same way.

The foregoing decription of the methods employed by me is merely illustrative of the invention.

I claim:
1. A composition for medical use substantially consisting of choline gluconate.
2. A syrup for medical use containing a combination of choline gluconate and a surplus of gluconic acid.

References Cited in the file of this patent

UNITED STATES PATENTS

| Number | Name | Date |
|---|---|---|
| 2,208,790 | Curtis | July 23, 1940 |
| 2,211,630 | Stuart | Aug. 13, 1940 |

FOREIGN PATENTS

| Number | Country | Date |
|---|---|---|
| 475,291 | Great Britain | Nov. 17, 1937 |
| 290,523 | Germany | Mar. 1, 1916 |

OTHER REFERENCES

Repertorium Pharm. Spez. Sera and Impfstoffe (1st supplement) by Ludwig (1947) pp. 45 and 207.

New and Nonofficial Remedies, pp. 375–377, 1950, J. P. Lippincott Co., Phila. Council of Pharmacy and Chemistry of the American Medical Assn.